United States Patent [19]

Meckel et al.

[11] Patent Number: 4,868,266

[45] Date of Patent: Sep. 19, 1989

[54] HEAT CURABLE ADHESIVE SYSTEM

[75] Inventors: Walter Meckel, Neuss; Rudolf Hombach, Leverkusen, both of Fed. Rep. of Germany

[73] Assignee: Bayer Aktiengesellschaft, Bayerwerk, Fed. Rep. of Germany

[21] Appl. No.: 253,210

[22] Filed: Oct. 4, 1988

[30] Foreign Application Priority Data

Oct. 10, 1987 [DE] Fed. Rep. of Germany ....... 3734340

[51] Int. Cl.$^4$ .............................................. C08G 18/22
[52] U.S. Cl. .......................................... 528/55; 528/60
[58] Field of Search ...................................... 528/55, 60

[56] References Cited

U.S. PATENT DOCUMENTS

| | | | |
|---|---|---|---|
| 2,908,657 | 10/1959 | Boggs | 260/9 |
| 3,488,302 | 1/1970 | Pyron | 260/9 |
| 4,119,594 | 10/1978 | Iobst et al. | 260/18 |
| 4,193,832 | 3/1980 | Reischl et al. | 156/331 |
| 4,390,678 | 6/1983 | LaBelle et al. | 528/60 |
| 4,585,803 | 4/1986 | Nelson et al. | 521/105 |
| 4,595,445 | 6/1986 | Hombach et al. | 156/307 |

FOREIGN PATENT DOCUMENTS 1408510 10/1975 United Kingdom .

Primary Examiner—Maurice J. Welsh
Attorney, Agent, or Firm—Gene Harsh; Joseph C. Gil; Aron Preis

[57] ABSTRACT

The present invention relates to a heat curable adhesive system comprising a prepolymer (P) based on isocyanate groups and polyether segments, and at least one polyhydroxyl compound (C), and a catalyst (D) characterized in that (a) the prepolymer (P) is formed on the basis of one or more polyols (A) containing polyether segments and having an average hydroxyl number of from 50 to 160 and an average functionality of from 2.05 to 2.6 and on at least one diphenylmethane diisocyanate (B) and (b) the polyhydroxyl compound (c) contains at least three hydroxyl groups per molecule and is dispersed in prepolymer (P) in a quantity of from 1 to 10 hydroxyl groups for each isocyanate group still available in the prepolymer (P) and melts at a temperature above 110° C. and (c) the catalyst (D) consists of at least one carboxylic acid salt of bismuth, cadminum, lead or zinc containing more than 12, in particular 14 carbon atoms, used in a solid form melting at a temperature above 100° C.

9 Claims, No Drawings

HEAT CURABLE ADHESIVE SYSTEM

FIELD OF THE INVENTION

This invention relates to a heat curable adhesive system, in particular a one pot system, and to a process for bonding materials.

BACKGROUND OF THE INVENTION

The use of two-component adhesives based on polyhydroxyl compounds and polyisocyanates is known from GB-PS No. 1,408,510 and DE-A No. 2,719,720. These systems always require a time consuming process of mixing and above all the optimum proportions of hydroxyl groups to isocyanate groups must be accurately observed, which is not always possible in practice. It is for this reason that there is an increasing demand for one-component systems which can simply be applied without previous mixing and dosing. The main one-component systems which have so far been developed are the moisture hardening systems, which have the disadvantage that they only harden very slowly owing to the slow diffusion of water, especially in thick bonding joints.

One-component systems which can also be relied upon to harden in thick joints are the heat curable systems. One example of such a system disclosed in DE-A No. 3,403,499 consists of dispersions of polyisocyanates in polyhydroxyl and/or amino compounds in which the polyisocyanates have been inactivated by certain operations.

The use of high melting hydroxyl compounds in systems containing isocyanate groups is described in U.S. Pat. No. 2,908,657. In these systems, starch was used as the polyhydroxyl compound. The possibility of using such systems as adhesives was described in U.S. Pat. No. 3,488,302 in which pentaerythritol in particular is used as hydroxyl component in a quantity of from 2 to 100 hydroxyl groups to one isocyanate group. Very flexible systems are described but these only harden slowly. EP-A No. 85,243 also describes systems containing isocyanate groups in which pentaerythritol is used as curing agent under the condition that the ratio of hydroxyl groups to isocyanate groups is less than two and preferably about 1. These systems have the disadvantage that the curing temperature is still too high but attempts to accelerate such systems by means of the conventional catalysts of isocyanate chemistry resulting in a loss of stability in storage which again limits the possibility of using these systems.

It has now surprisingly been found that storage stable systems which harden at temperatures below 120° C. are obtained when metal salts of fatty acids containing more than 11 carbon atoms and having melting points above 100° C. are used as catalysts. The catalytic activity of zinc stearate on the reaction of hydroxyl groups and isocyanate groups has been described in U.S. Pat. No. 4,119,594 but only for elastomers with limited pot life produced by the RIM system.

The positive effect of metal salts on the adhesive properties of the systems according to the invention is surprising since salts such as zinc stearate have always been used as mould release agents for plastics parts to facilitate their removal from metal moulds as well as in the RIM process (see U.S. Pat. No. 4,585,803) and it was therefore not to be expected that these additives would improve the bond strength of adhesive systems, especially on metals such as steel.

SUMMARY OF THE INVENTION

The present invention relates to a heat curable adhesive system based on
(1.) prepolymers (P) containing both isocyanate groups and polyether segments, and
(2.) polyhydroxyl compounds (C) characterized in that
 (a) the prepolymer (P) is formed on the basis of one or more polyols (A) containing polyether segments and having an average hydroxyl number of from 50 to 160 and an average functionality of from 2.05 to 2.6 and on at least one diphenylmethane diisocyanate (B) and
 (b) the polyhydroxyl compound (C) contains at least three hydroxyl groups per molecule and is dispersed in prepolymer (P) in a quantity of from 1 to 10 hydroxyl groups for each isocyanate group still available in the prepolymer (P) and melts at a temperature above 110° C. and
 (c) the catalyst (D) consists of at least one carboxylic acid salts of bismuth, cadmium, lead or zinc containing more than 12, in particular 14 carbon atoms, used in a solid form melting at a temperature above 100° C.

DETAILED DESCRIPTION OF THE INVENTION

The polyols with polyether segments (A) are preferably those obtained from bifunctional or trifunctional starting compounds by the addition of propylene and-/or ethylene oxide. The starting compounds used for the polyols are mainly bifunctional compounds such as water, propylene glycol, butane-1,4-diol, butylamine, hydroquinone, 4,4'-dihydroxy-diphenylmethane, 2,2-bis-(4-hydroxy-phenyl)-propane or aniline or trifunctional starting compounds such as trimethylolpropane or glycerol. Polyether esters obtained, for example, by the esterification of polyethers of the type mentioned above with dicarboxylic acids such as adipic acid or phthalic acid may also be used. Glycols such as ethylene glycol, butane-1,4-diol or hexane 1,6-diol may also be used in the esterification reaction.

The average hydroxyl number of polyol (A) or of the polyol mixture (A) is in the range of 50 to 160, preferably 70 to 150 and most preferably 90 to 140. The average hydroxyl number is calculated from the following formula:

$$\text{average hydroxyl number } \overline{H} = \frac{\Sigma g_i \times H_i}{\Sigma g_i}$$

where $g_i$ is the weight of the individual components i with hydroxyl number $H_i$.

The average functionality $\overline{F}$ is calculated from the formula $$\overline{F} = \Sigma m_i * F_i$$

where $m_i$ is the molar fraction of the individual components and $F_i$ the functionality of the individual components, based on the isocyanate reactivity.

The polyol or polyol mixture (A) may consist of several components, mainly bifunctional compounds with an average molecular weight of from 600 to 3000, preferably from 800 to 2500, and/or trifunctional components having a molecular weight of from 300 to 6000, preferably from 400 to 4600.

One particularly preferred diphenylmethane diisocyanate (B) is 4,4'-diphenylmethane diisocyanate, optionally used with 0 to 60% of 2,4'-diphenylmethane diisocyanate.

The polyol or polyol mixture (A) is reacted with an excess of diphenylmethane diisocyanate (B) to produce a prepolymer containing preferably 6 to 15% by weight, in particular 9 to 13% by weight of isocyanate groups.

The prepolymer (P) obtained by the reaction of (A) and (B) is combined with the polyhydroxyl compound (C), which preferably has a particle size below 100μm, more preferably below 75 μm, in particular by stirring the polyhydroxyl compound into the prepolymer.

Tris-(2-hydroxyethyl)-isocyanurate, pentaerythritol, mannitol and sorbitol are examples of compounds (C). Among these, pentaerythritol is particularly preferred but mixtures of such compounds may be used for obtaining lower melting points. The ratio of hydroxyl groups in the high melting hydroxyl compound (C) to the free isocyanate groups in the prepolymer is generally from 1:1 to 10:1, preferably from 1.5:1 to 5:1 and most preferably from 2:1 to 4:1.

The catalyst (D) is preferably present in a quantity of from 0.02 to 0.5% by weight, based on the whole system, in particular from 0.1 to 0.3% by weight. Component (D) is generally in a solid, finely divided form, preferably having a particle size in the range of from 5 to 75 μm.

The adhesive systems according to the invention are preferably prepared in conventional stirrer apparatus by reacting the polyols (A) which contain ether groups with the diisocyanates (B) at temperatures from 50° to 80° C. until the isocyanate content is constant and then adding the high melting hydroxyl compounds (C), at which stage the temperature should not rise above 70° C. The catalysts (D) are then added, and again the temperature should not rise above 70° C.

Alternatively, the high melting hydroxyl compound (C) together with all or part of the polyols (A) may be ground to a particle size below 100 μm in a suitable mill, e.g. a corundum disc mill, at a temperature which should not be above 60° C., and this mixture is then reacted with the diisocyanates (B) until a constant NCO-value is obtained. The catalyst (D) is then added.

Other isocyanates may be added to the diphenylmethane diisocyanates (B) in a quantity of up to 10% by weight; for example, 2,4- and 2,6-tolylene diisocyanate or a mixture of these isomers, 4,4'-dicyclohexylmethane diisocyanate, isophorone diisocyanate or hexamethylene diisocyanate.

Additives may also be added to the systems, especially when particular flow properties are required, for example, inert inorganic fillers such as heavy spar, aluminum oxide or, in particular hydrophobic fumed silica e.g. aerosils marketed by Degussa as Aerosil R202. This operation is preferably carried out in suitable kneading apparatus.

Plasticizers and/or high boiling hydrocarbons may be added.

The systems are preferably filled into drums or cartridges from which the adhesive is directly applied to the substrate by drum pumps or under pressure and is then cured by a heat treatment in an oven, by heated clamping jaws or by microwave heating.

It is sometimes sufficient if the adhesive only partly gels so that it is firm enough to handle but the temperature should at some stage have risen to 100°–120° C. in the adhesive joint.

The adhesives according to the invention are suitable for bonding a wide variety of substrates, such as SMC to SMC, steel or aluminum or thermoplastic polymers such as ABS, polycarbonate, etc. to the same polymers or to metals such as steel or aluminum or, of course, also for bonding metals such as steel or aluminum to one another.

The invention is further illustrated, but is not intended to be limited by the following examples in which all parts and percentages are by weight unless otherwise specified.

EXAMPLES

Preparation of the Systems

The polyols are dehydrated in a vacuum (<20 Torr) at 100° C. for one hour. After the addition of 4,4'-diphenylmethane diisocyanate containing 2% of 2,4'-diphenylmethane diisocyanate, the prepolymer containing isocyanate groups is stirred at 60° to 80° C. until the isocyanate content is constant.

The dry, high melting polyhydroxyl compounds are stirred in under a vacuum. The metal salt catalysts and any other additives used are then stirred in at temperatures below 60° C.

The stability of the systems in storage is tested after 3 days storage at 50° C.

Steel test samples measuring 20×40 mm are washed with methylene chloride and after exposure to air they are placed together with the adhesive overlapping by 10 mm and heated to 110° C. and 140° C., respectively, they are subjected to a tension and shear rate according to DIN 53,283 at the rate of feed of 100 mm/min.

Experiments 1a, 2a and 3a could not be assessed at a heating temperature of 110° C. because of test samples fell apart due to lack of curing.

Legend

A1—Straight chained polypropylene glycol ether m.wt. 1000; OH number 112; functionality 2.0

A2—Straight chained polypropylene glycol ether m.wt. 2000; OH number 56; functionality 2.0

A3—Polypropylene glycol ether starting on trimethyolopropane, m.wt. 450; OH number 375; functionality 3.0

A5—Straight chained polypropylene glycol ether m.wt. 220; OH number 515; functionality 2.0

A6—Straight chained polyether ester obtained from 1 mol of polyether A, 2 mol of adipic acid and 2 mol of hexane-1,6-diol C1—Pentaerythritol C2—Tris-(2-hydroxyethyl)isocyanaurate C3—Mannitol C4—Mixture of C1 and C3 in the ratio of 1:1

D1—Zinc stearate

D2—Zinc octoate (m.pt.<100° C.)

D3—Bismuth stearate

D4—Lead Stearate

D5—Cadmium stearate

TABLE 1

| Example | A | Polyol | OH Number | Functionality | Prepolymer % NCO | Hydroxyl compound C | OH/NCO | Catalyst D % by weight |
|---|---|---|---|---|---|---|---|---|
| 1 | 1 | mol A 1<br>0.33 mol A 2<br>0.53 mol A 3 | 125 | 2.28 | 11.2 | C 1 | 1.8 | 0.1 D 1 |
| 1a | | " | " | " | " | " | " | / |
| 2 | | " | " | " | " | " | 3.0 | 0.1 D 1 |
| 2a | | " | " | " | " | " | " | / |
| 2b | | " | " | " | " | " | " | 0.1 D 2 |
| 3 | | " | " | " | " | " | 4.2 | 0.1 D 1 |
| 3a | | " | " | " | " | " | " | / |
| 4 | | " | " | " | " | C 2 | 1.8 | 0.1 D 1 |
| 5 | | " | " | " | " | C 3 | 3.0 | 0.1 D 1 |
| 6 | | " | " | " | " | C 4 | 3.0 | 0.1 D 1 |
| 7 | | " | " | " | " | C 1 | 3.0 | 0.1 D 3 |
| 8 | | " | " | " | " | " | 3.0 | 0.1 D 4 |
| 9 | | " | " | " | " | " | 3.0 | 0.1 D 5 |
| 10 | | 1 mol A 2<br>2 mol A 5<br>0.57 mol A 3 | 160 | 2.15 | 9.5 | " | 3.0 | 0.1 D 1 |
| 11 | | 1 mol A 6<br>0.44 mol A 3 | 110 | 2.30 | 10.5 | " | 3.0 | 0.1 D 1 |

4,4'-Diphenylmethane diisocyanate containing 2% by weight of 2,4'-diphenylmethane diisocyanate was used as isocyanate (B) for the preparation of prepolymer (P). Results:

TABLE 2

| | | Tension and shear strength (mPa) after heating for | | | |
|---|---|---|---|---|---|
| | | 15 min. at 140° C. | | 15 min at 110° C. | |
| Example | Stability | after 1 h | after 24 h | after 1 h | after 24 h |
| 1 | stable | 16.2 | 16.0 | 5.3 | 11.4 |
| 1a* | stable | 15.0 | 15.0 | no adherence | |
| 2 | stable | 14.3 | 17.0 | 7.8 | 9.4 |
| 2a* | stable | 15.0 | 15.5 | no adherence | |
| 2b* | unstable | | | | |
| 3 | stable | 21.0 | 17.0 | 8.5 | 14.8 |
| 3a* | stable | 15.0 | 16.0 | no adherence | |
| 4 | stable | 14.0 | 16.0 | 6.3 | 12.2 |
| 5 | stable | 18.0 | 20.0 | 8.1 | 14.6 |
| 6 | stable | 20.0 | 24.0 | 10.3 | 15.7 |
| 7 | stable | 17.3 | 19.5 | 4.8 | 12.2 |
| 8 | stable | 15.0 | 17.0 | 6.3 | 14.0 |
| 9 | stable | 12.0 | 13.5 | 4.2 | 14.9 |
| 10 | stable | 6.8 | 7.5 | 3.0 | 6.0 |
| 11 | stable | 18.5 | 20.0 | 9.3 | 15.8 |

*Comparison experiment

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Heat curable adhesive system comprising a prepolymer (P) containing both isocyanate groups and polyether segments, and at least one polyhydroxyl compound (C), and a catalyst (D) characterized in that
   (a) the prepolymer (P) is based on one or more polyols (A) which contain polyether segments, having an average hydroxyl number of about 50 to 160 and an average functionality of about 2.05 to 2.6 and at least one diphenylmethane diisocyanate (B) and
   (b) the polyhydroxyl compound (C) contains at least three hydroxyl groups per molecule, and is dispersed in a quantity corresponding to 1 to 10 hydroxyl groups for each isocyanate group still available in said prepolymer (P) said (C) having a melt temperature above 110° C. and
   (c) said catalyst (D) consists of at least one carboxylic acid salt of bismuth, cadmium, lead or zinc containing more than 12 carbon atoms, which is present in a solid form having a melting temperature above 100° C.

2. The adhesive system of claim 1, wherein said average hydroxyl number is about 90 to 140 and said average functionality is about 2.1 to 2.4.

3. The adhesive system of claim 1, wherein said polyols are derived from bifunctional or trifunctional starting components by the addition of propylene oxide and/or ethylene oxide.

4. The adhesive system of claim 1, wherein said diphenylmethane diisocyanate contains 4,4'-diphenylmethane diisocyanate and 0 to 60%, based on the total quantity of said (B) of 2,4'-diphenylmethane diisocyanate.

5. The adhesive system of claim 1, wherein said polyhydroxyl compound (C) is pentaerythritol.

6. The adhesive system of claim 1, wherein said catalyst (D) is present substantially in a solid, finely divided form.

7. The adhesive system of claim 1, wherein said (D) is zinc stearate and is present at a quantity of from 0.02 to 0.5%, based on the weight of said system.

8. The adhesive system of claim 1, characterized in that it is a one pot system.

9. A process for bonding materials comprising applying to at least one surface thereof the heat curable adhesive system of claim 1.

* * * * *